Sept. 3, 1963   N. J. MILLER   3,102,440
RADIAL DRILL PRESS
Filed Dec. 13, 1961
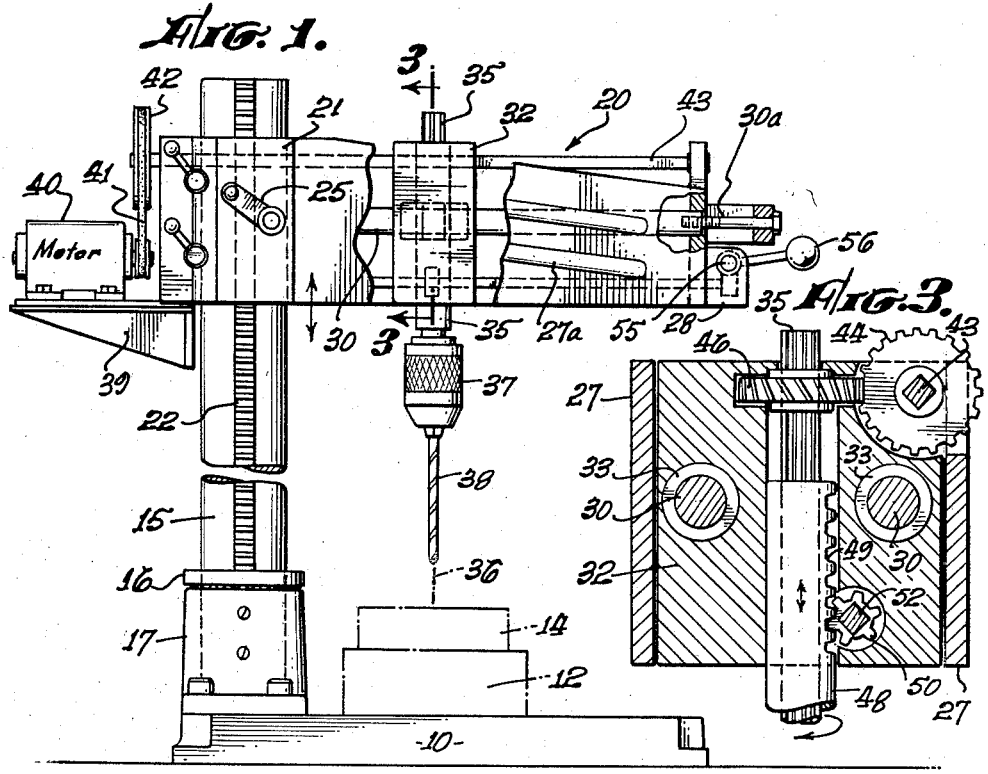
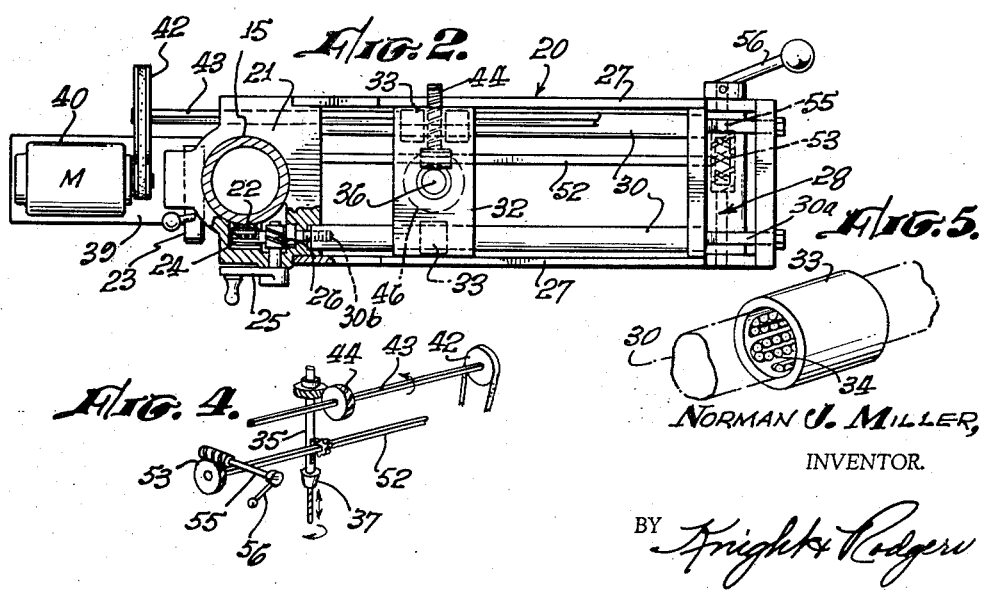
NORMAN J. MILLER,
INVENTOR.
BY Knight & Rodgers
ATTORNEYS 3,102,440
RADIAL DRILL PRESS
Norman J. Miller, Los Angeles, Calif., assignor to Solidaire, Inc., Monrovia, Calif., a corporation of California
Filed Dec. 13, 1961, Ser. No. 159,182
10 Claims. (Cl. 77—28)

The present invention relates generally to machine tools and more especially to improvements in a radial arm drill press.

Various problems arise in radial drill presses of the larger sizes because of the extreme weight and size of the components of the press. The most commonly encountered design of a drill press involves placing the drill spindle and the driving motor on a carriage which moves longitudinally of a radial arm. The arm is supported at only one end on a vertically extending post around the axis of which the arm is designed to swing.

In a drill press of a large size, the motor is necessarily large in order to provide adequate power for drilling operations. The motor itself is a very heavy component of the assembly and, in combination with the drill spindle and carriage, provides a very substantial weight that must be supported by the cantilevered arm. The accuracy of the drill is dependent in part upon the rigidity of the radial arm; and in order to avoid as far as possible an intolerable amount of deflection when the motor and drill spindle are at the outer end of the arm, the arm is made very heavy to obtain the necessary strength. As the motor gets heavier and the drill spindle larger, it is necessary to increase the strength of the arm in order to support the greater weight; but this becomes something of a vicious circle since the increase in size of the arm to carry the live load produces an increase in dead load that itself requires a further increase in size in order to give the added strength necessary.

As a matter of actual practice radial drill presses of this design, particularly in the larger sizes, do not have sufficient rigidity that the deflection of the arm is within acceptable limits for precise work. In other words, the axis of the drill, as it moves outwardly on the arm, departs from a truly vertical position and the result is that the holes drilled are either out of round or do not have a truly vertical axis. Sometimes both conditions prevail.

Another difficulty encountered with this well known design of a radial drill press is that the eccentric loading on the post causes the post to bind in its bearings with the result that it is very difficult to swing the radial arm horizontally and this makes it difficult to locate the drill accurately with respect to the work piece.

Thus it becomes a general object of the present invention to provide a novel design for a radial arm drill press which results in improved weight distribution which in turn will permit a reduction in the size and weight of the structural portions of the drill press.

It is also a general object of the invention to provide a novel design for a radial drill press in which the loading of the structural parts is reduced sufficiently that their deflection can be kept within allowable limits for precision work.

A further object of the invention is to provide an improved design for a radial drill press which reduces the eccentric loading and enables the arm to be rotated horizontally more freely and with easier accuracy of positioning.

These objects of my invention are achieved in a radial drill press having a supporting post rising from a base; an arm mounted on the post for vertical travel and horizontal rotation about the axis of the post, said arm including a pair of spaced side plates which support the outer end of a pair of spaced parallel guide rods which extend horizontally and are supported at their inner end by a collar formation surrounding the post; a carriage slidably mounted on said rods to travel longitudinally of the arms; a drill spindle; means mounting the spindle on the carriage to establish a vertical axis of drill rotation between the rods; and drive means for rotating the spindle, including a motor which is carried by the arm and located on the opposite side of the post from the carriage whereby the weight of the motor counter balances to some extent the weight of the carriage on the arm. Suitable bearing means are provided for mounting the carriage on the parallel guide rods, such bearing means including bearings of the reciprocating ball bearing type; and means are provided for pre-stressing the guide rods in tension.

How the above objects of my invention, as well as others not specifically referred to herein, are attained, will be better understood by reference to the following description and the annexed drawing, in which:

FIG. 1 is a side elevation of a radial drill press embodying my invention.

FIG. 2 is a plan view thereof.

FIG. 3 is a vertical section through the arm and carriage on line 3—3 of FIG. 1.

FIG. 4 is a diagrammatic perspective view of a means for driving and positioning the drill spindle.

FIG. 5 is a fragmentary perspective illustrating the reciprocating type ball bearing mounting the carriage on the guide rods.

Referring now to the drawing, there is shown in FIG. 1 in elevation a drill press embodying the present invention. The press comprises a base 10 upon which is shown schematically a work piece 12 into which holes are to be drilled, a hole jig 14 being superimposed on the work piece in order to position the drill for accurate placement of the holes.

Rising vertically from base 10 is post or column 15 which is mounted in collar 17 bolted or otherwise suitably attached to base 10. Above collar 17 is thrust bearing 16 which surrounds post 15 and may be of any suitable design. It is not shown in detail since bearings for this purpose are well known in the art.

Mounted upon post 15 is the radial arm assembly indicated generally at 20. The arm assembly includes a collar structure 21 surrounding the post and in engagement therewith to maintain a constant angular relation between the axis of the arm and the axis of the post. Ideally, the axis of post 15 is vertical and the axis of arm 20 is horizontal. Post 15 may be provided with a rack 22 at one side, the collar 21 being recessed as shown in FIG. 2 in order to receive the rack. A pinion 24 meshing with the rack is rotated by means of handle 25 and gears at 26 to raise and lower the arm along post 15.

The lower end of rack 22 rests on bearing 16 and the rack is supported thereby. When arm assembly 20 is rotated around post 15, the rack rotates around the post and the weight of the arm assembly is transmitted through the rack to the thrust bearing. During drilling, the arm is held in place by one or more locking cams 23 which may be rotated to lock the arm on the post against rotation.

Extending radially outward from collar 21 and attached thereto at the inner ends, are a pair of parallel side plates 27 which are relatively deep in a vertical direction as compared with their horizontal thickness. At their outer ends, the two side plates 27 are connected to and support a cross member 28 which ties the plates together and also provides a support for certain other members as will be described.

Positioned between and extending horizontally parallel to the side plates is a pair of cylindrical rod guides 30. The guide rods 30 are supported at their inner ends by collar formation 21 and at their outer ends by cross member 28 which has smooth bores to receive rods 30. Cross member 28 extends between and is supported by side plates 27. It is desirable that guides 30 be cylindrical in external conformation to accommodate carriage bearings, as later described, and that they be heat treated to produce a hard, wear resistant surface as well as a high unit tensile strength. A hardness of 60–62 Rockwell is preferred. After mounting the guide rods in the radial arm assembly 20, the rods are stressed by placing them in tension. Any means for so doing can be employed; but as an example of suitable means the outer ends of the rods are shown as attached to bolts 30a threaded into tapped holes in the outer ends of the rods. Bolts 30 pass through a U-shaped bridge 31 with the bolt heads bearing against a transverse portion of the bridge. The two legs of the bridge, one at each end, bear against the forward ends of side plates 27, as seen in FIG. 2. The matching surfaces on the bridge legs and on the side plates are very accurately machined to transmit loads from one to the other. At the rear end, each guide 30 is received in a socket in collar structure 21 and held there by a bolt 30b threaded into the guide rod with the bolt head bearing against the collar structure.

By turning the bolts 30a the guide rods are placed in a normally stressed condition, under suitable tension. The reaction to this tension force in the guides is provided by side plates 27 which are placed in compression. Plates 27 may have ribs 27a to better resist any buckling. The tension in the rods makes them more rigid for a given size, that is guides of a given diameter deflect much less when an upward force is applied to the guides during drilling operations. This makes possible smaller rods and a lighter arm assembly for a given degree of accuracy; or a higher degree of accuracy for members of a given size. Minimum deflection insures continued alignment of all parts of the arm assembly.

Slidably mounted upon guide rods 30 is carriage 32. The carriage is supported on the rods at three positions by means of three reciprocating ball bearings of the type illustrated in FIG. 5. Each of these bearings 33 comprises a sleeve with a plurality of axially extending interconnected rows of balls 34 located inside the sleeve and at a position to bear against the rod 30 within the sleeve. There are two horizontally extending bores in carriage 30. In one of these bores is located a single bearing 33, the lower bore in FIG. 2. In the other of these bores, the upper bore in FIG. 2, are two such bearings 33 through which passes the other of the guide rods 30. By what is the equivalent of a three-point support, the carriage is held firmly against twisting out of position yet is free to move longitudinally along the rods.

Drill spindle 35 is rotatably mounted in carriage 33 to establish a vertical axis 36 about which the drill rotates. Spindle 35 carries collet or chuck 37 in which is mounted drill 38. The axis 36 of drill rotation is vertical and passes between two guide rods 30, preferably substantially midway between the rods.

The drill spindle is rotated by suitable drive means which includes motor 40 mounted on bracket 39 in turn attached to arm 20 at the side of post 15 opposite to spindle 35. This arrangement not only reduces the weight that is supported by side plates 27 but by placing the weight of motor 40 on the side of the vertical post opposite carriage 32, the weight distribution is such that the eccentric loading on the post is greatly reduced and the arm 20 turns more freely on bearing 16. Output shaft of motor 40 drives through belt 41 to pulley 42 mounted on one end of shaft 43 which is of square or other non-circular outline. As shown in FIG. 3 particularly, shaft 43 passes through a hole in spiral gear 44 which conforms in shape to the outline of shaft 43. Thus as shaft 43 rotates it in turn drives spiral gear 44, and gear 44 is free to move longitudinally along shaft 43. This arrangement permits the spindle to be driven at any position that the carriage may occupy along the length of the radial arm, it even being possible to drive the spindle as the carriage is moved along the arm.

A spiral gear 46 is rotatively mounted by suitable bearings on carriage 32 to turn about a vertical axis. Gear 46 meshes with and is driven by gear 44, these two gears providing the driving connection between shaft 43 and the drill spindle. The upper end of spindle 35 has a spline connection with gear 46, permitting the drill spindle to move axially up and down with respect to gear 46, as is well known in the art.

Surrounding spindle 35 is stationary sleeve 48 which is provided at one side with a series of teeth 49 which form a rack. Meshing with the rack 49 is pinion 50 which is non-rotatively attached to square shaft 52. Shaft 52 may be rotated by means of a pair of gears indicated generally at 53 and carried in cross member 28, one of the gears being attached to the end of shaft 52 and the other to cross shaft 55 on the end of which is mounted handle 56. Rotation of handle 56 in a vertical plane produces movement which is transmitted through shaft 52 and pinion 50 to sleeve 48, raising or lowering drill spindle 35 in order to move the spindle toward and away from the work piece 12, as is well known in the art. These elements including handle 56, shaft 55, gears 53 and rack and pinion 49 and 50 provides a hand operated feed for advancing drill 38 into the work piece; and may be replaced, if desired, by a power feed driven from motor 40. Such power feed mechanisms are well known in the art and any suitable drive may be used. As carriage 32 moves axially of rods 30, pinion 50 moves with the carriage while remaining in mesh with the rack 49 on fixed sleeve 48 and likewise the pair of gears 44 or 46 move with the carriage so that the power flow to the spindle is continuously maintained throughout the range of movement of the carriage.

The vertical axis of spindle 35 is preferably substantially midway between the two rods 30 in order to distribute the load during drilling substantially equally between the two rods. Equal distribution of the load makes for a minimum size of both rods. Otherwise, the exact location of the vertical axis may be shifted as desired.

The present arrangement makes possible use of the anti-friction bearings 33 for slidably mounting the carriage on support and guide rods 30. This reduces the friction to be overcome between the carriage and its supporting structure. Also this construction reduces very greatly the weight of the carriage and attached parts as compared with previously known constructions in which the drive motor is mounted on the carriage. All this combines to produce the collective result of a carriage that moves easily lengthwise of arm 20 and which is itself of minimum weight. As a consequence, carriage 32 moves with comparative ease along guide rods 30 and can be positioned quickly and accurately.

By locating motor 40 on the side of post 15 away from carriage 32, the weight of the motor counterbalances more or less of the weight of the carriage and arm 20. As a consequence, the eccentric loading on post 15 is greatly reduced by comparison with previously known designs and there is much less tendency for the arm assembly 20 to bind on post 15. As a result, the arm can be rotated in a horizontal plane about the vertical axis of the post with comparative ease.

It will be apparent that changes in the design and arrangement of the parts comprising the present invention may be made by persons skilled in the art without departing from the spirit and scope of the present invention. Accordingly, it is to be understood that the foregoing is considered to be illustrative of, rather than limitative upon, the invention as defined by the appended claims.

I claim:
1. In a radial drill press the combination comprising:
a supporting post rising from a base;
an arm mounted on the post for vertical travel and horizontal rotation about the axis of the post, said arm including a pair of spaced, parallel guide rods extending horizontally;
a carriage mounted on said rods to travel longitudinally thereof;
a drill spindle;
means mounting the spindle on said carriage to establish a vertical axis of spindle rotation between the rods;
and drive means for rotating the spindle.

2. In a radial drill press, the combination as in claim 1 in which the axis of spindle rotation is substantially midway between the guide rods.

3. In a radial drill press, the combination as in claim 1 which includes bearing means slidably mounting the carriage on the guide rods to support the carriage at only three positions, distributed two on one guide rod and one on the other guide rod.

4. In a radial drill press the combination as in claim 1 which includes bearing means mounting the carriage on the guide rods, the bearing means including bearings of the reciprocating ball bearing type.

5. In a radial drill press, the combination as in claim 4 in which the guide rods have a hardness of 60–62 Rockwell resulting from heat treatment.

6. In a radial drill press the combination comprising:
a supporting post rising from a base;
an arm mounted on the post for vertical travel and horizontal rotation about the axis of the post, said arm including a pair of spaced, parallel guide rods extending horizontally, a collar structure surrounding the post, a pair of parallel side plates connected at their inner ends to the collar structure, and a cross-support connected to the outer ends of the side plates, the guide rods extending between and supported by the collar structure and the cross-support;
a carriage mounted on said rods to travel longitudinally thereof;
a drill spindle;
means mounting the spindle on said carriage to establish a vertical axis of drill rotation between the rods;
and drive means for rotating the spindle.

7. In a radial drill press, the combination as in claim 6 which includes means bearing against one end of the parallel side plates for pre-stressing the guide rods in tension whereby the reaction places the side plates in compression lengthwise of the arm.

8. In a radial drill press the combination comprising:
a supporting post rising from a base;
an arm mounted on the post for vertical travel and horizontal rotation about the axis of the post, said arm including a pair of spaced, parallel guide rods extending horizontally;
a carriage mounted on said rods to travel longitudinally thereof;
a drill spindle;
means mounting the spindle on said carriage to establish a vertical axis of spindle rotation between the rods;
drive means for rotating the spindle;
and means pre-stressing the guide rods in tension.

9. In a radial drill press, the combination as in claim 8 in which the axis of spindle rotation is substantially midway between the guide rods.

10. In a radial drill press, the combination comprising:
a supporting post rising from a base;
an arm mounted on the post for vertical travel and horizontal rotation about the axis of the post, said arm including a pair of spaced, parallel guide rods extending horizontally;
a carriage mounted on said rods to travel longitudinally thereof;
a drill spindle;
means mounting the spindle on said carriage to establish a vertical axis of spindle rotation;
drive means for rotating the spindle;
and means pre-stressing the guide rods in tension.

References Cited in the file of this patent
UNITED STATES PATENTS

| | | |
|---|---|---|
| 2,317,568 | Wallace et al. | Apr. 27, 1943 |
| 2,621,686 | Tompkins | Dec. 16, 1952 |
| 2,882,761 | Knosp et al. | Apr. 21, 1959 |